United States Patent Office 3,050,522
Patented Aug. 21, 1962

3,050,522
MANUFACTURE OF SUBSTITUTED ORGANIC
PHOSPHINE DERIVATIVES
Harold Coates, Wombourn, and John Joseph Lawless, Tipton, England, assignors to Albright & Wilson (Mfg.) Limited, Oldbury, near Birmingham, England
No Drawing. Filed July 10, 1959, Ser. No. 826,145
Claims priority, application Great Britain July 15, 1958
10 Claims. (Cl. 260—249.6)

This invention is for the preparation of condensation products containing the grouping P—CH$_2$—N for use in the manufacture of thermosetting resins and flame-proofing materials.

A process for the preparation of aminomethylphosphine derivatives involving the reaction of phosphine or substituted phosphines with formaldehyde and an amino compound or a methylolamine compound has already been described in copending application, Serial No. 761,932, filed September 19, 1958 (now U.S. Patent No. 3,037,978).

We have now found that an analogous reaction may be carried out using amido compounds. A condensation product may be prepared in a very convenient manner by the direct reaction of phosphine or a substituted phosphine with formaldehyde and an amido compound or with a methylol derivative of the amido compound.

According to the present invention there is provided a process for the production of a condensation product containing P—CH$_2$—N linkages which comprises reacting a phosphine of the general formula R$_n$PH$_{3-n}$ with formaldehyde and an amido compound or with methylol derivatives of an amido compound, where R is an alkyl, aralkyl, aryl or heterocyclic radical, and $n$ is 0, 1 or 2.

When $n=2$ the products are in general monomeric, whereas when $n=0$ or 1 the products may be polymeric, depending on the reactants and reaction conditions.

The reactions may be expressed by the general formulae:

$$R_nPH_{3-n}+CH_2O+HN< \rightarrow R_nP(CH_2N<)_{3-n}$$

$$R_nPH_{3-n}+(3-n)HOCH_2-N< \rightarrow R_nP(CH_2N<)_{3-n}$$

where N is an amido nitrogen, or the equivalent thereof.

In general, the most convenient method of carrying out the reaction is as follows: The phosphine is added gradually, through a gas distributor if gaseous, to a vigorously stirred solution of the amido compound and formaldehyde or of the methylolamido compound under an inert atmosphere such as nitrogen or CO$_2$. Water is a very suitable and convenient solvent in which to carry out the reaction but any other inert solvent may be used. It is also possible, but more difficult, to operate in the absence of solvent.

Examples of suitable phosphines include phosphine itself, methylphosphine, ethylphosphine, butylphosphine, dibutylphosphine and phenylphosphine. Examples of suitable amido compounds are urea, dicyandiamide, guanidine, biuret, semicarbazide and melamine.

Since the condensation products may be used in the manufacture of thermosetting resins or in the flame-proofing of textiles, it is important under these circumstances that the condensation reaction is not carried out to completion, i.e. that the reaction product should contain unreacted methylol groups and also unreacted hydrogen atoms on either P and/or N. This condition is ensured by adjusting the molecular proportions of the reactants, the reaction temperature and time.

As will be obvious to those skilled in the art, the reaction may frequently be pH-dependent, necessitating the use of acidic or buffer solutions and also the simultaneous addition of two or more reactants in order to minimise unwanted side reactions. The absorption of phosphine may be accelerated by the addition of a tertiary organic base to the reaction mixture.

The following examples will serve to illustrate the manner in which the invention may be carried into effect:

Example 1.—To a solution of formaldehyde (40%) (300 ml.) in water (300 ml.) and concentrated hydrochloric acid (10 ml.) was added, gradually with vigorous stirring, a solution of urea (120 gm.) in water (200 ml.), keeping the temperature at approximately 80° C. Whilst the urea solution was being added, phosphine was passed in continuously through a gas distributor. After 15 hous, a colourless, slightly viscous solution was obtained. This was filtered and the filtrate evaporated as rapidly as possible under vacuum (12 mm. of mercury) giving a colourless viscous syrup which, on analysis, was found to contain 4.6% P.

By adding the urea solution and phosphine simultaneously the concomitant formation of a urea-formaldehyde resin was kept to a minimum.

Example 2.—Guanidine sulphate (100 gm.) was dissolved in water (200 ml.), and an aqueous solution of formaldehyde (37%) (100 ml.) added. The solution was placed in an apparatus equipped with a stirrer, and a gas inlet and outlet, and the air flushed out with a stream of nitrogen. A slow stream of phosphine was passed through the vigorously stirred solution for 16 hours at room temperature. The excess of phosphine was flushed out in a stream of nitrogen. Concentration of the aqueous solution in vacuo (12 mm. of mercury) to 50° C. gave a light brown viscous syrup (156 gm.). Found: P, 5.65%.

Example 3.—Dicyandiamide (100 gm.) was dissolved in an aqueous solution of formaldehyde (37%) (150 ml.), sodium hydroxide (1 gm.) and water (150 ml.) and tri-n-butylamine (50 ml.) added. The tri-n-butylamine did not appear to dissolve. The mixture was treated with phosphine for 12 hours at room temperature as in Example 2. The mixture was allowed to settle and the aqueous solution separated from the tri-n-butylamine. Concentration of the aqueous solution in vacuo (12 mm. of mercury) to 50° C. gave a viscous syrup (155 gm.). Found: P, 2.63%.

Example 4.—Hexamethylolmelamine (60 gm.) was dissolved in water (60 ml.) and an aqueous solution of formaldehyde (37%) (6 ml.) added. Di-n-butyl phosphine (10.5 gm.) was added, and the mixture well agitated for 15 minutes under an atmosphere of nitrogen. The phosphine dissolved to give a homogeneous solution. The product was concentrated in vacuo (12 mm. of mercury) to 50° C. to give a colourless, hazy, viscous liquid (84 gm.). Found P, 2.71%.

The resulting product has the formula

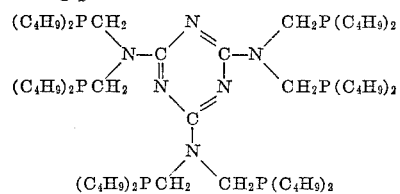

The following example illustrates the utility of the products of the invention in relation to the flame-proofing of textiles.

Example 5.—60 gm. of the colourless, viscous syrup (prepared as described in Example 1) were dissolved in water (50 ml.) and a solution of BT 309 (a partially methylated trimethylolmelamine sold by B.I.P. Chemicals Ltd.) (25 g.) in water (25 ml.) containing 1 gm. monoammonium phosphate as curing catalyst, was added.

A piece of 6 oz. white cottom denim cloth was padded in this solution using a laboratory padding mangle. The pick-up of solution was 95% of the weight of the original cloth. The treated denim was dried at 95°–100° C. for 10 minutes and the resin on the cloth was cured by baking the cloth at 145° C. for 5 minutes.

The cloth was then washed in hot very dilute soda ash solution containing a little hydrogen peroxide and was finally rinsed in cold water.

The resulting resin-treated denim was flame-resistant and this flame-resistance was retained after boiling in ¼% soap-soda solution.

It will be understood that the invention is not limited to the amido-compounds or phosphines exemplified in the foregoing Examples but is broadly directed to the use of the various amido-compounds and phosphines generally referred to in which connection it need only be remarked that guanidine is alternatively named imino-urea and that melamine is conventionally regarded as being the triamide of cyanuric acid (Organic Chemistry: Karrer).

Illustrative of the nature of the products of the present invention, the formula of the products derived from urea and a disubstituted phosphine would be $$R_2PCH_2NHCONH_2 \text{ or } R_2PCH_2NHCONHCH_2PR_2$$

We claim:

1. A process for the production of amidomethylphosphines which consists essentially of reacting a phosphine of the formula $R_nPH_{3-n}$ wherein R represents a radical selected from the group consisting of alkyl having from 1 to 4 carbon atoms and phenyl, and $n$ is an integer ranging from 0 to 2 with formaldehyde and with an amide selected from the group consisting of urea, dicyandiamide, guanidine, biuret, semicarbazide and melamine, in solution in an inert solvent and at a temperature ranging from room temperature to about 80° C.

2. A process for the production of amidomethylphosphines which consists essentially of reacting a phosphine of the formula $R_nPH_{3-n}$ wherein R represents a radical selected from the group consisting of alkyl having from 1 to 4 carbon atoms and phenyl, and $n$ is an integer ranging from 0 to 2 with hexamethylolmelamine, in solution in an inert solvent and at a temperature ranging from room temperature to about 80° C.

3. A process for the production of an amidomethylphosphine which comprises mixing formaldehyde and urea in aqueous solution in the presence of hydrochloric acid at a temperature of about 80° C. and passing simultaneously a stream of gaseous phosphine therethrough, and separating the resulting colorless syrup from the reaction mixture.

4. The colorless syrupy amidomethylphosphine produced as described in claim 3.

5. A process for the production of an amidomethylphosphine which comprises mixing formaldehyde and guanidine sulfate in aqueous solution and passing through the mixture with stirring a stream of phosphine at room temperature, and concentrating the resulting reaction mixture thereby to obtain a light brown, viscous syrupy product.

6. The light brown syrupy amidomethylphosphine produced as described in claim 5.

7. A process for the production of an amidomethylphosphine which comprises mixing formaldehyde, dicyandiamide and tri-n-butylamine in aqueous dispersion and in the presence of sodium hydroxide therein, and passing a stream of phosphine through the resulting mixture at room temperature, separating excess of tri-n-butylamine the reaction mixture and concentrating the remaining aqueous solution in vacuo, thereby obtaining a viscous syrupy product.

8. The viscous syrupy amidomethylphosphine produced as described in claim 7.

9. A process for the production of an amidomethylphosphine which comprises mixing hexamethylolmelamine and formaldehyde in aqueous solution, adding di-n-butyl phosphine to the resulting mixture and stirring under an inert atmosphere, and concentrating the resulting reaction mixture in vacuo, thereby obtaining a colorless, hazy, viscous liquid.

10. The compound of the formula

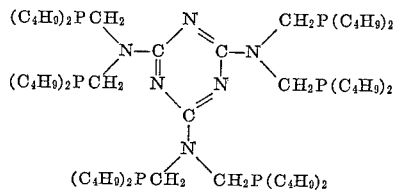

References Cited in the file of this patent

UNITED STATES PATENTS

| | | |
|---|---|---|
| 2,584,112 | Brown | Feb. 5, 1952 |
| 2,812,311 | Reeves | Nov. 5, 1957 |
| 2,861,901 | Reeves et al. | Nov. 25, 1958 |

FOREIGN PATENTS

| | | |
|---|---|---|
| 196,417 | Austria | Mar. 25, 1958 |
| 761,985 | Great Britain | Nov. 21, 1956 |

OTHER REFERENCES

Kosolapoff: Organo-phosphorous Compounds, page 15, John Wiley and Sons (1950).

Reeves et al.: J. Am. Chem. Soc., vol. 77, pages 3923–4 (1955).